(12) United States Patent
Dixon et al.

(10) Patent No.: US 11,238,399 B2
(45) Date of Patent: Feb. 1, 2022

(54) METHODS AND SYSTEMS FOR ON-DEMAND DYNAMIC VEHICLE ROUTING

(71) Applicant: United States Postal Service, Washington, DC (US)

(72) Inventors: Robert E. Dixon, Haymarket, VA (US); Ryan Luckay, Vienna, VA (US)

(73) Assignee: United States Postal Service, Washington, DC (US)

( * ) Notice: Subject to any disclaimer, the term of this patent is extended or adjusted under 35 U.S.C. 154(b) by 52 days.

(21) Appl. No.: 16/036,829

(22) Filed: Jul. 16, 2018

(65) Prior Publication Data

US 2019/0019149 A1    Jan. 17, 2019

Related U.S. Application Data

(60) Provisional application No. 62/533,244, filed on Jul. 17, 2017.

(51) Int. Cl.
*G06Q 10/08*    (2012.01)
*G01C 21/34*    (2006.01)
(Continued)

(52) U.S. Cl.
CPC ..... *G06Q 10/08355* (2013.01); *G01C 21/343* (2013.01); *G01C 21/3415* (2013.01); *G05D 1/0212* (2013.01); *G05D 1/0287* (2013.01); *G06Q 10/06315* (2013.01); *G06Q 10/0834* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS 8,798,902 B2 *    8/2014    Kumar ............... B60L 3/12
                                                    701/417
2002/0010633 A1    1/2002    Brotherston
(Continued)

FOREIGN PATENT DOCUMENTS

JP    2005115673    *    4/2005

OTHER PUBLICATIONS

International Search Report and Written Opinion dated Sep. 20, 2018 in International Application No. PCT/US2018/042340 filed Jul. 16, 2018.
(Continued)

*Primary Examiner* — Genna M Mott
(74) *Attorney, Agent, or Firm* — Knobbe Martens Olson & Bear LLP (57) ABSTRACT

Methods and systems for on demand logistics management are disclosed. An on-demand logistics system includes an electronic hardware processor configured to receive an on-demand request, the request indicating an on-demand location for an on-demand transaction, determine locations of a plurality of vehicles on a plurality of delivery routes, determine whether the on-demand location is within a threshold distance of at least one of the plurality of delivery routes based on the vehicle locations and assign the on-demand transaction to a vehicle based on the determination.

19 Claims, 9 Drawing Sheets

(51) Int. Cl.
*G05D 1/02* (2020.01)
*G06Q 10/06* (2012.01)

(56) References Cited

U.S. PATENT DOCUMENTS

| | | | |
|---|---|---|---|
| 2003/0014286 A1* | 1/2003 | Cappellini | G06Q 10/02 705/5 |
| 2004/0059647 A1* | 3/2004 | Hudson | G06Q 10/06 705/28 |
| 2007/0073552 A1 | 3/2007 | Hileman | |
| 2010/0088011 A1* | 4/2010 | Bruce | G01C 21/20 701/532 |
| 2013/0006442 A1 | 1/2013 | Williams et al. | |
| 2014/0236778 A1* | 8/2014 | Villardito | G06Q 10/087 705/28 |
| 2015/0193724 A1 | 7/2015 | Stevens et al. | |
| 2015/0325128 A1 | 11/2015 | Lord et al. | |
| 2016/0019501 A1* | 1/2016 | Olechko | G06Q 10/08355 705/338 |
| 2016/0048804 A1* | 2/2016 | Paul | G06Q 10/08355 705/338 |
| 2016/0300186 A1* | 10/2016 | Scharaswak | G06Q 10/0835 |
| 2016/0364678 A1 | 12/2016 | Cao | |
| 2016/0379167 A1* | 12/2016 | Raman | G06Q 10/08355 705/338 |
| 2016/0379168 A1* | 12/2016 | Foerster | G06Q 10/08355 705/7.16 |
| 2017/0102243 A1 | 4/2017 | Samocha et al. | |
| 2017/0147975 A1* | 5/2017 | Natarajan | G05D 1/0676 |
| 2018/0096287 A1* | 4/2018 | Senger | G06Q 10/08355 |
| 2018/0211217 A1* | 7/2018 | Berdinis | G06Q 10/08355 |
| 2018/0232841 A1* | 8/2018 | Stumpf | G06Q 50/30 |
| 2018/0260752 A1* | 9/2018 | Verma | G06Q 10/06311 |
| 2018/0341918 A1* | 11/2018 | Raut | G06Q 10/08355 |
| 2018/0349849 A1 | 12/2018 | Jones et al. | |
| 2019/0220785 A1* | 7/2019 | Tanno | G06Q 10/083 |

OTHER PUBLICATIONS

International Preliminary Report on Patentability dated Jan. 30, 2020 in International Application No. PCT/US2018/042340 filed Jul. 16, 2018.

International Search Report and Written Opinion dated Jun. 10, 2020 in International Application No. PCT/US2020/021224 filed Mar. 5, 2020.

* cited by examiner

METHODS AND SYSTEMS FOR ON-DEMAND DYNAMIC VEHICLE ROUTING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

This disclosure relates to dynamic routing of delivery vehicles, and in particular, to dynamic routing that satisfies constraints relating to operator work restrictions.

BACKGROUND

Internet based ordering is becoming more commonplace. Many service providers offer expedited shipping that can satisfy consumer demands quickly, albeit at enhanced cost. Users of such services often require delivery of items within hours, rather than days. As demand for such services increases, the ability to timely fulfill requests is threatened. Accordingly, an innovative system and process for identifying and efficiently using pickup and delivery resources is needed.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features being described provide advantages that include data authentication services.

In one aspect described herein, an on-demand logistics system comprises an electronic hardware processor, configured to: receive an on-demand request, the request indicating an on-demand location for an on-demand transaction; determine locations of a plurality of vehicles on a plurality of delivery routes; determine whether the on-demand location is within a threshold distance of at least one of the plurality of delivery routes based on the vehicle locations; and assign the on-demand transaction to a vehicle based on the determinations.

In some embodiments, the request further indicates an item for delivery to the on-demand location, and wherein the electronic hardware processor is configured to determine the plurality of vehicles based on the item.

In some embodiments, determining the plurality of vehicles comprises identifying, and including in the plurality of vehicles, those vehicles which include the item in a vehicle inventory.

In some embodiments, the hardware processor is further configured to receive location updates for a vehicle, wherein the determination of the locations is at least partially based on the location updates.

In some embodiments, assigning the on-demand transaction to a vehicle comprises transmitting a command to the vehicle, the command indicating the vehicle will perform the on-demand transaction.

In some embodiments, the vehicle is an autonomous vehicle, and the command updates a route database of an on-board vehicle control computer.

In some embodiments, the hardware processor is further configured to determine, from among one or more of the plurality of delivery routes, the route requiring the minimum amount of deviation to fulfill the on-demand request, and assigning the on-demand request to the vehicle performing the minimum deviation route.

In some embodiments, determining the route requiring the minimum amount of deviation comprises: determining, for each of the one or more routes, the minimum amount of route deviation required to fulfill the on-demand request; determining operators for the one or more delivery routes; determining a maximum deviation amount for each of the operators; and determining which of the one or more routes has the smallest minimum deviation amount which also does not exceed its operator's maximum deviation amount.

In some embodiments, the hardware processor is further configured to determine whether the on-demand request can be fulfilled within a specified time period using the determined route.

In another aspect, an on-demand logistics system, comprises an electronic hardware processor, configured to: receive an on-demand request, the request indicating a location for an on-demand transaction; identify one or more delivery routes having a portion located within a threshold distance of the location; determine which of the one or more delivery routes requires the least amount of route deviation to accomplish the on-demand transaction; and assign the on-demand transaction to a vehicle on the determined delivery route.

In some embodiments, the request further indicates an item for delivery to the location, and wherein the electronic hardware processor is configured to determine the route for accomplishing the transaction further based on vehicle inventory of the item on each of the one or more routes.

In another aspect, a non-transitory computer readable medium comprises instructions that when executed cause an electronic hardware processor to perform a method of assigning an on-demand request to a vehicle on a delivery route, the method comprising: receiving an on-demand request, the request indicating an on-demand location for an on-demand transaction; determining locations of a plurality of vehicles on a plurality of delivery routes; determining whether the on-demand location is within a threshold distance of at least one of the plurality of delivery routes based on the vehicle locations; and assigning the on-demand transaction to a vehicle based on the determinations.

In some embodiments, the request further indicates an item for delivery to the on-demand location, and wherein the method further comprises determining the plurality of vehicles based on the item.

In some embodiments, determining the plurality of vehicles comprises identifying, and including in the plurality of vehicles, those vehicles which include the item in a vehicle inventory.

In some embodiments, the method further comprises receiving location updates for a vehicle, wherein the determination of the locations is at least partially based on the location updates.

In some embodiments, assigning the on-demand transaction to a vehicle comprises transmitting a command to the vehicle, the command indicating the vehicle will perform the on-demand transaction.

In some embodiments, the vehicle is an autonomous vehicle, and the command updates a route database of an on-board vehicle control computer.

In some embodiments, the method further comprises determining, from among one or more of the plurality of delivery routes, the route requiring the minimum amount of deviation to fulfill the on-demand request, and assigning the on-demand request to the vehicle performing the minimum deviation route.

In some embodiments, determining the route requiring the minimum amount of deviation comprises: determining, for each of the one or more routes, the minimum amount of route deviation required to fulfill the on-demand request; determining operators for the one or more delivery routes; determining a maximum deviation amount for each of the operators; and determining which of the one or more routes has the smallest minimum deviation amount which also does not exceed its operator's maximum deviation amount.

In some embodiments, the method further comprises determining whether the on-demand request can be fulfilled within a specified time period using the determined route.

In some embodiments, the request further indicates an item for delivery to the location, and wherein the method further comprises determining the route for accomplishing the transaction based further on vehicle inventory of the item on each of the one or more routes.

BRIEF DESCRIPTION OF THE DRAWINGS

These drawings and the associated description herein are provided to illustrate specific embodiments of the invention and are not intended to be limiting.

DETAILED DESCRIPTION

Figure 1:
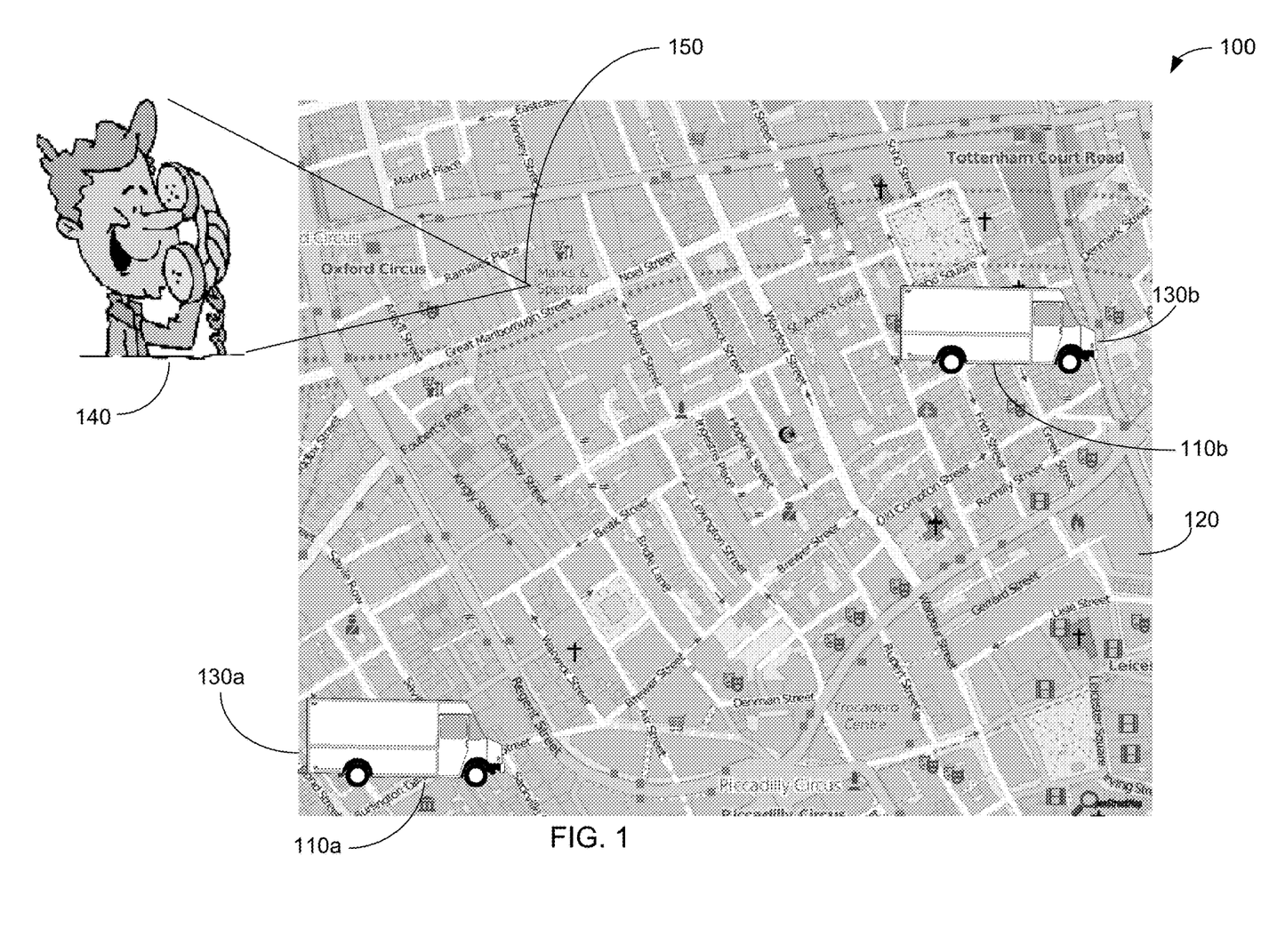
FIG. 1 is an overview diagram of an on-demand delivery system 100.

FIG. 1 is an overview diagram of an on-demand delivery system 100. The on-demand delivery system 100 includes a plurality of delivery vehicles 110a-b traveling over a geographic area 120. At any particular time, a first delivery vehicle 110a may be located at a first position 130a while a second delivery vehicle 110b may be located at a second position 130b.

While the vehicles 110a-b are located at the positions 130a-b, a customer 140 may call a representative of the on-demand delivery system 100 (not shown), to request an on-demand transaction. In some embodiments, the customer 140 may contact the representative of the on-demand delivery system 100 via a mobile computing device, such as using an application on a smartphone, via a web browser, or via another computing device. In some embodiments, the customer 140 may contact the representative (or an automated system) via a merchant, supplier, or broker, who has access to the on-demand delivery system 100. The on-demand transaction may include one or more of a pick-up of a package from the customer's location 150 or delivery of one or more items or packages (not shown) to the customer's location 150. The on-demand transactions may include customer preferences and/or specific time constraints, geography constraints, vehicle size constraints, and the like. For example, a customer may have requested delivery or pick-up by a certain time of day, or may have a perishable item for pick-up or delivery, or may have a large or irregularly shaped item which cannot fit in every vehicle 110a-b.

The disclosed methods and systems determine whether one of the delivery vehicles 110a-b can satisfy the on-demand request from the customer 140. They also develop and implement the processes for fulfilling this request. The determination may be based on a number of conditions, such as the current locations of each of the vehicles 110a-b, their planned routes through the geographic area 120, the location of the on-demand transaction 150, inventory of items requested by the on-demand transaction on the delivery vehicles 110a-b, item size, item type, customer preferences or specific constraints, among other conditions. By considering a variety of factors, the disclosed methods and systems may efficiently satisfy the on-demand request of the customer 140.

The disclosed methods and systems can be used on a local level, such as depicted in FIG. 1, and can also be used on a city or town level, a county level, a state level, a regional level, a national level, or within any desired geographic area.

Figure 2:
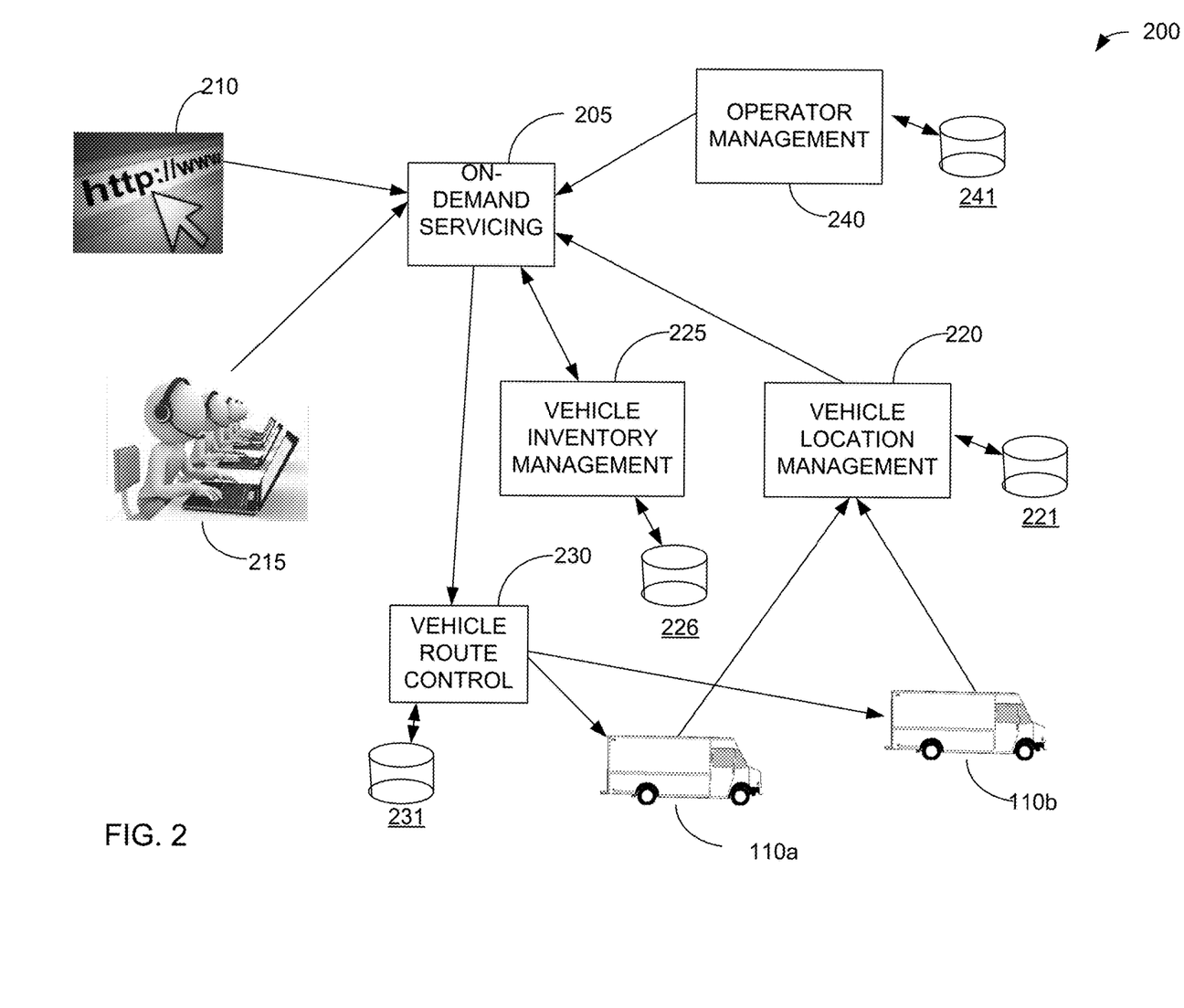
FIG. 2 is an exemplary block diagram of the on-demand system 100.

FIG. 2 is an exemplary block diagram of the on-demand system 100. The on-demand system 100 includes an on-demand servicing component 205 such as a central computer system including at least a processor, memory, data storage, and user and system interfaces. The on-demand servicing component 205 may receive on demand requests from a customer, such as the customer 140 discussed above with respect to FIG. 1. In some aspects, the on-demand request may be received via a computer portal 210, such as a website, an internet-enabled computing device, an application, a smartphone, and the like. In some aspects, the on-demand request may be received from a call center 215, with the customer 140 calling into the call center 215 to indicate their request.

To satisfy the request, the on-demand servicing component 205 interacts with a vehicle location management component 220 a vehicle inventory management component 225, a vehicle route control component 230, and an operator management component 240. The vehicle location management component 220 receives vehicle location updates from delivery vehicles 110a-b and stores the location information in a vehicle database 221. Although two vehicles 110a-b are depicted, the term vehicles 110a-b can indicate any number of vehicles and any type of vehicle. This information may then be provided to the on-demand servicing component 205 as needed.

The vehicle inventory management component 225 may track inventory in each of the delivery vehicles 110a-b. For example, one or more of the vehicles 110a-b may carry inventory that can be used to satisfy on-demand requests that may arise while the vehicle 110a-b is on a delivery route. The on-demand servicing component 205 may consult the vehicle inventory management component 225 to determine which vehicles 110a-b have inventory available to satisfy a particular request. The vehicle inventory management component 225 may store inventory information in an inventory database 226.

Upon selecting a vehicle to fulfill the on-demand request, the on-demand servicing component 205 may update a vehicle's route to include the on-demand request. To accomplish this, the on-demand servicing component 205 may communicate with the vehicle route control component 230. The vehicle route control component 230 may then provide updated route information to a delivery vehicle, such as delivery vehicles 110a-b. The vehicle route control component 230 may store vehicle route information in a route database 231. This process will be described in greater detail below.

Selection of a vehicle by the on-demand servicing component 205 to satisfy an on-demand request may be based, in some aspects, on the operator of the vehicle. For example, operators may provide delivery and/or pick-up services based on terms of a contract. In some aspects, that contract may specify a maximum deviation of an operator's work day that may be required by their employer. In some embodiments, the maximum deviation can be a maximum distance, time elapsed (such as the time required to make a delivery and return to the regularly scheduled route), time required to make an additional delivery, or other desired parameter. The maximum deviation for a particular operator may be stored in an operator database 241. The operator management component 240 may consult the operator database 241 to determine maximum deviations allowed under contract for one or more operators as requested by the on-demand servicing component. This information may be used when selecting a vehicle and thus an operator to perform a particular on-demand service request. The selection may ensure, in some aspects, that assigning a particular on-demand request to a particular vehicle/operator will not violate the terms of the operator's employment contract, as defined by the operator database 241.

Figure 3:
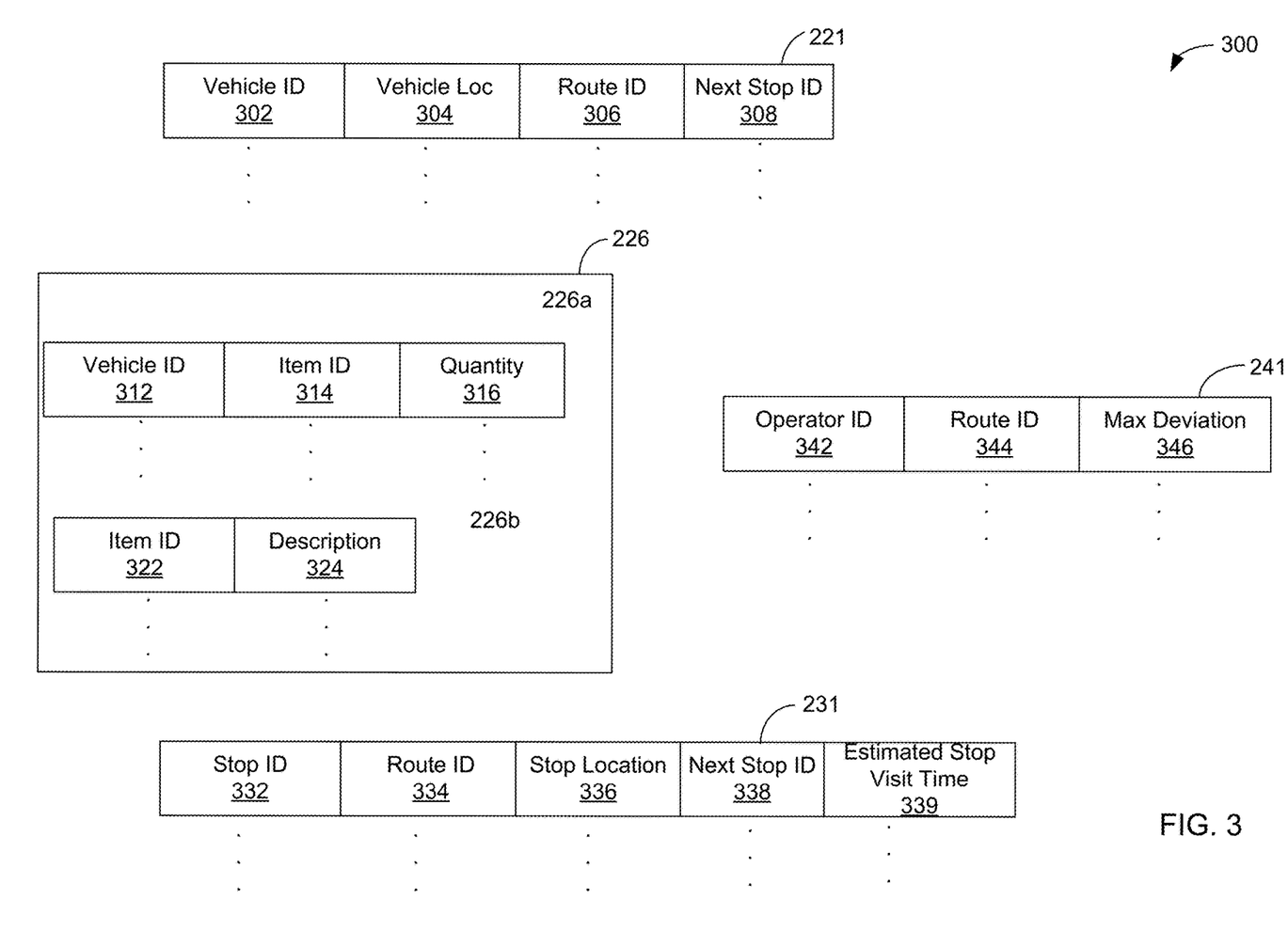
FIG. 3 shows exemplary table structures for relational databases of FIG. 2.

FIG. 3 shows exemplary table structures for relational databases of FIG. 2. The vehicle database 221 may include a vehicle identification 302, vehicle location 304, route identification 306, and next stop identification 308. The vehicle identification may serve to uniquely identify a vehicle within the on-demand system 100. The vehicle location column 304 may indicate a most recently reported location of the vehicle identified by the vehicle ID column 302. The vehicle location column 304 may be set by the vehicle location management component 220 upon receiving a location update from a vehicle, such as any of vehicles 110a-b. The route identification field 306 may identify a delivery route assigned to the vehicle identified via the vehicle ID field 302. The next stop identification field 308 may indicate a next stop for the vehicle identified by the vehicle identification field 302 along the route identified by the route ID field 306.

The next stop can be determined based on the current position of the vehicle or the carrier and the list of stops in the route database 231. The next stop is the next sequential position along a vehicle's route according to the current geographic position of the vehicle as received from the vehicle.

The vehicle inventory database 226 includes a table 226a having a vehicle ID column 312, item ID column 314, and a quantity column 316. The item ID column 314 identifies an inventory item record in the inventory item table discussed below.

The inventory item table 226b includes an item ID column 322 and a description column 324. The description column 324 includes a text description of the inventory item identified by the item ID column 322.

The route database 231 includes a stop identification column 332, route identification column 334, stop location column 336, a next stop identification column 338, and an estimated time column 339. The stop identification column 332 provides a unique identifier for a stop on the route identified by the route identification column 334, within the on-demand system 100. The stop location column 336 identifies a geographic location of the stop identified by the stop identification column 332. The geographic location can be stored in the stop location column 336 as an address, or as location coordinates, such as GPS coordinates. The next stop identification column 338 identifies a stop that is scheduled after the stop identified by the stop identification column 332, along the route identified in the route identification column 336. The estimated time column 339 includes the estimated time a delivery resource, such as vehicle 110a-b, will be at the next stop.

The operator database 241 includes an operator ID column 342, a route ID column 344, and a max deviation column 346. The operator ID column 342 contains a unique identifier for an operator. The route ID column 344 identifies a route in the route database 231 assigned to the operator identified by column 342. The maximum deviation column 346 indicates a maximum deviation from the route (identified by route ID 344) allowed for the operator (identified by operator id 342), or vehicle (identified by vehicle ID 312).

Figure 4:
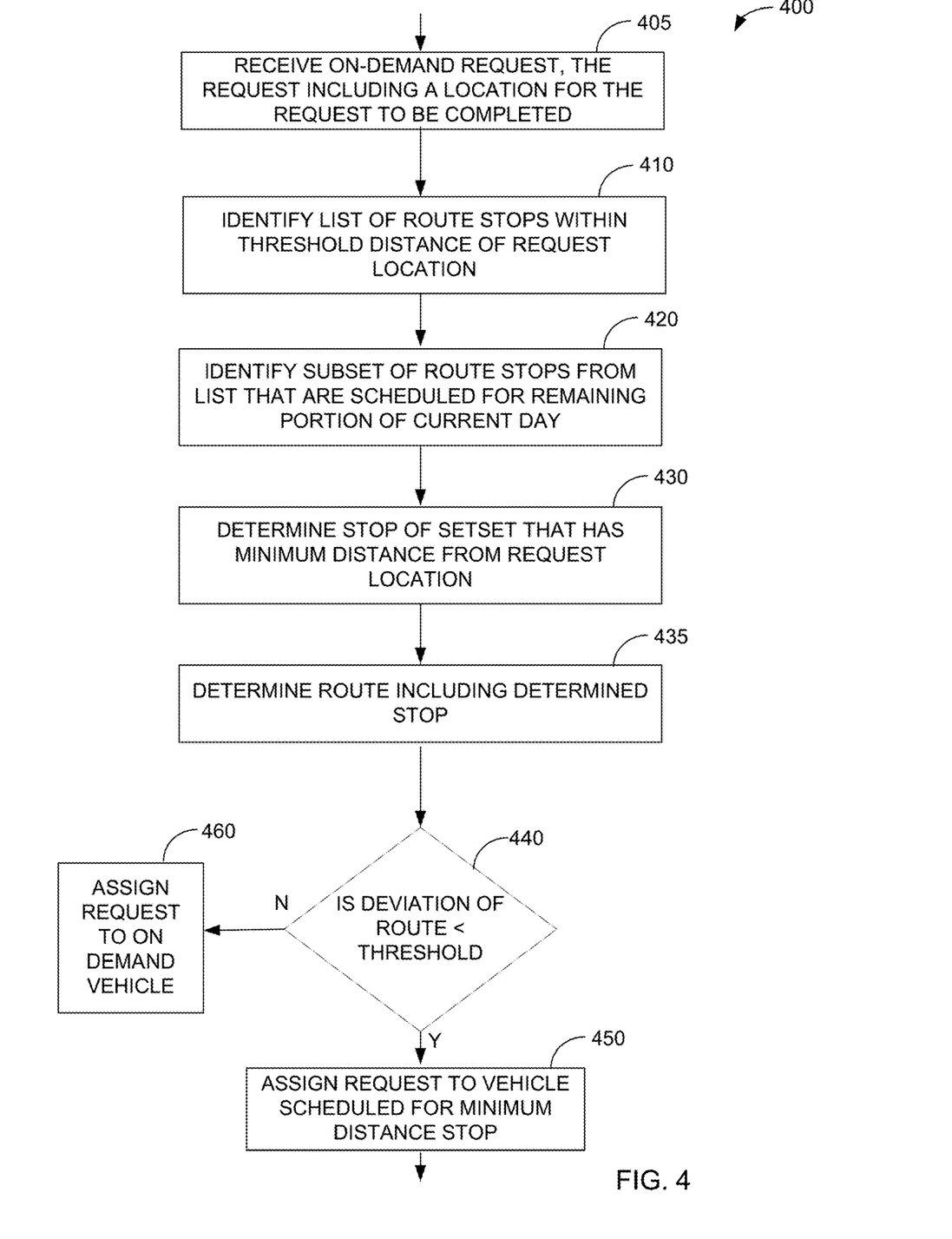
FIG. 4 is a flowchart of an exemplary method for satisfying an on-demand request within the system 100.

FIG. 4 is a flowchart of an exemplary method for satisfying an on-demand request within the system 100. In some aspects, the process 400 discussed below with respect to FIG. 4 may be performed by the on-demand servicing component 205 discussed above with respect to FIG. 2. For example, in some aspects, the on-demand servicing component may include data defining instructions for an electronic hardware processor. The electronic hardware processor may execute the instructions, which configure the processor to perform the functions of process 400 discussed below.

In block 405, an on-demand request is received at the on-demand service component 205. For example, as discussed above, a customer 140 may initiate an on-demand request to the system 100. The request may indicate a geographic location at which the request will be completed. The on-demand request may request a package be picked-up at a location, such as a home or business address associated with the customer 140. Alternatively or in addition, the request may be for delivery of a package or an item. For example, in some aspects, the on-demand system may provide for on-demand shopping. A customer 140 may select a particular item they desire to purchase, and submit an on-demand request to the system 100 indicating same. In some other aspects, the system 100 may provide for on-demand delivery of packages shipped directly to the customer. By requesting the delivery on-demand, the customer 140 may avoid packages being dropped off at their associated location when they are not prepared to receive the delivery.

In block 410, a list of route stops is identified that is within a threshold distance of the location for the request to be completed. In some embodiments, the threshold may be a threshold time of travel. The time of travel can be an estimated time it would take a vehicle to move from its current position to the location of the on-demand request. It may be that a vehicle which is closer geographically may actually take longer to arrive at the on-demand request location based on traffic conditions, road conditions, instant direction of travel, and other similar reasons. In some aspects, block 410 may be performed as described below with respect to FIG. 5.

In block 420, a subset of route stops from the list identified in block 410 is identified. The subset includes route stops that are still pending for the current day. In other words, block 420 identifies delivery or pickup stops that a vehicle is yet to make. Stops that have already been completed may not be particularly relevant to scheduling an on-demand transaction, since the vehicle may have already departed the location of the completed stop and may no longer be in a proximity of that location for the remainder of the day.

In block 430, a stop with a minimum distance from the location for the request to be completed is identified. In determining the minimum distance stop, block 430 may compare stop locations in column 336 of the route database 231 to determine the stop within the subset which has the minimum distance between a stop and the location for the request to be completed.

In block 435, a route associated with the determined stop is identified. In some aspects, block 435 may include determining a record in the database 231 with a stop identification column 332 equivalent to the stop identification for the stop with the minimum distance determined in block 430.

Block 440 determines if a deviation from the route associated with the minimum distance is greater than a threshold deviation. In some aspects, the threshold may be based on the identity of an operator performing the route. For example, in some aspects, block 440 may search the operator database 241 for an entry having a route identification column 344 that matches the route identification of the route determined in block 435. The entry, as shown in FIG. 3, may also include an ID of an operator in the operator ID column 342. A maximum deviation for the operator with the ID in column 342 may be provided by column 346. The deviation provided by column 346 may be the threshold of decision block 440 in some aspects. If the deviation from the route of 435 is less than a threshold (deviation provided by column 346 in some aspects), then process 400 moves to block 450, which assigns the on-demand request to the vehicle scheduled for the minimum distance stop which was determined in block 430.

Block 450 assigns the request to a vehicle scheduled for the minimum distance stop. In some aspects, the vehicle may be identified via the vehicle database 221. For example, the route determined in block 435 may be utilized to search the vehicle database 221 for a row with a route id column 306 matching the determined route. The vehicle ID field 302 of the identified row may indicate that the vehicle is to be assigned the request.

In some aspects, assigning the request to one of vehicles 110a-b may include transmitting an electronic command, for example, via a network message utilizing TCP/IP or other networking protocol, to the assigned vehicle 110a or 110b, indicating the assignment. In some aspects, the vehicle 110a or 100b may be configured to execute the request autonomously. For example, in embodiments utilizing autonomous delivery vehicles, assigning the request to the vehicle may control the vehicle to perform the request, such as delivering an inventory item to an address associated with the request, or picking up a package from the address, without human intervention.

While process 400 describes one aspect of assigning a request to a vehicle, other embodiments are contemplated. For example, in some aspects, the vehicle database 221 may be searched for a vehicle closest to the location specified in the on-demand request. The search may be based on the vehicle location field 304. In some aspects, vehicles within a predetermined range may be identified. From the identified vehicles, stops remaining for a particular day may be identified, based on the route id field 306 and the route database 231. A vehicle to be assigned to the on-demand request may then be determined as the vehicle having a remaining stop closest to the on-demand location.

Figure 5:
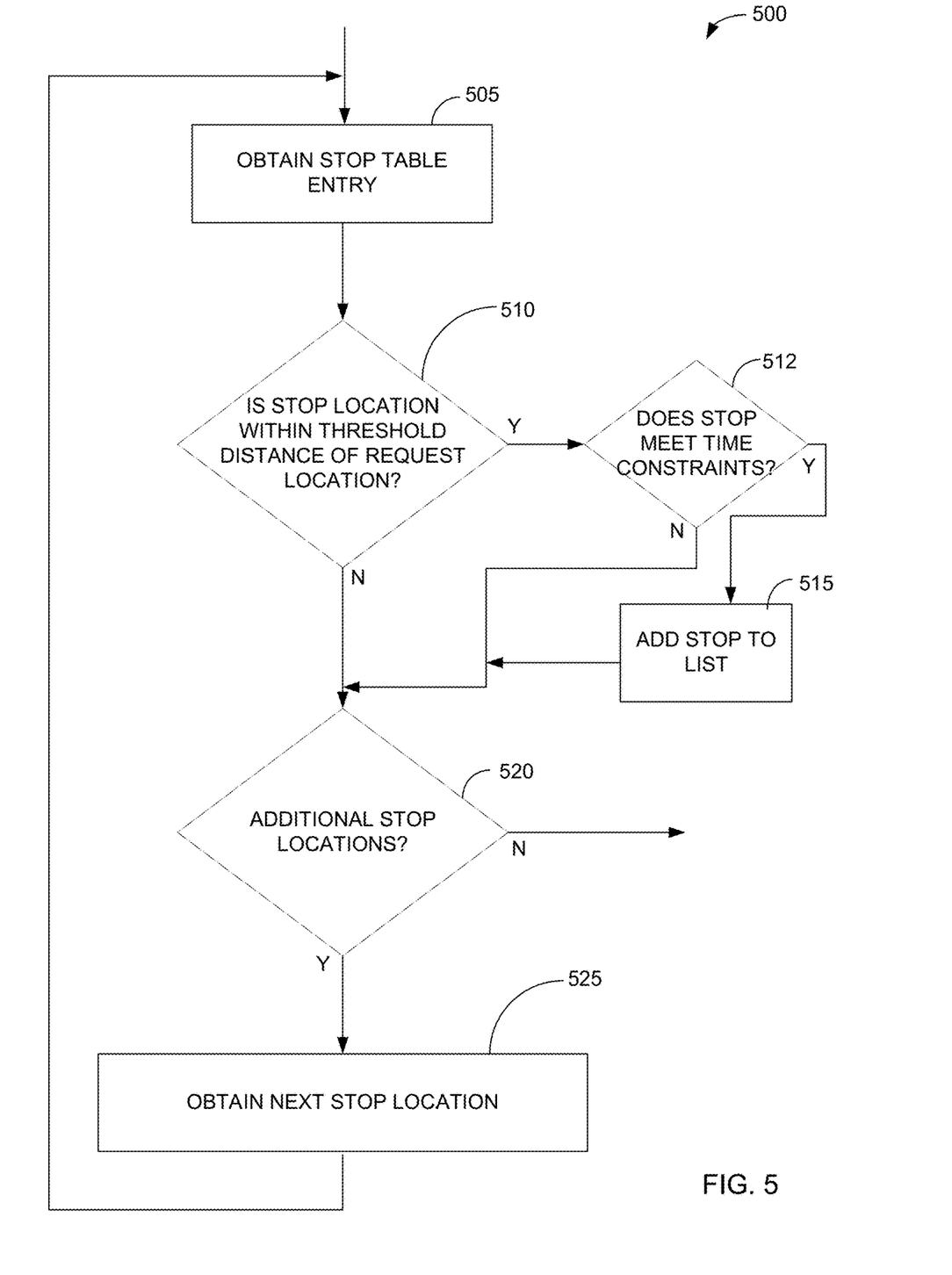
FIG. 5 is a flowchart of a method for identifying stops within a threshold distance of a location associated with an on-demand request.

FIG. 5 is a flowchart of a method for identifying stops within a threshold distance of a location associated with an on-demand request. In some aspects, the on-demand request may be for delivery of an item or package to the location. In some aspects, the on-demand request may be for pick-up of a package at the location. In some aspects, the process 500 discussed below with respect to FIG. 5 may be performed by an electronic hardware processor. For example, in some aspects, instructions contained within one or more of the on-demand servicing component 205 and/or the vehicle route control component 230 may configure the electronic hardware processor to perform the process 500. In some aspects, process 500 described below is one way of implementing block 410, discussed above with respect to process 400 and FIG. 4.

In block 505, a stop table entry is obtained. In some aspects, the stop table entry may be obtained from the route table 231, discussed above with respect to FIG. 3.

The process 500 may iterate through the route database 231, and examine each row (stop) to determine if a stop is within a threshold distance of or time of travel to the location associated with the request. Accordingly, in decision block 510 a stop identified in the stop table is evaluated to determine if it is within a threshold distance from the identified stop. If the stop location is not found to be within the threshold distance, the process 500 moves to block 520 and proceeds as described hereinafter.

If the stop location is found to be within the threshold distance, process 500 moves from decision block 510 to decision block 512, which evaluates whether the stop meets time constraints. Time constraints may be based on a deadline to complete the on-demand request, and a time at which a vehicle may visit the stop location. In some aspects, the time may be stored in the estimated stop visit time field 339 of the route database 231. In some aspects, block 512 may utilize a metric to determine an amount of time required for a vehicle to get from the stop to a location indicated by an on-demand request. The metric may be based on the geographic region of the stop. For example, stops located in more metropolitan areas may require more time for a given geographic distance than stops located in more rural areas. The metric may be used, in combination with a distance between the stop's location and the location associated with the on-demand request, to determine whether the stop can be utilized to plan servicing of the on-demand request. If the stop does not meet the time constraints, process 500 moves from block 512 to block 520, and proceeds as discussed hereinafter. Otherwise, process 500 moves from block 512 to block 515, which adds the stop to a list, and then moves to block 520.

Decision block 520 evaluates whether there are additional stop locations that have not yet been evaluated. If there are, process 500 moves to block 505, which obtains a next stop for evaluation, and the process 500 continues as discussed above. Otherwise, if there are no other stop locations to evaluate, the process 500 ends after block 520. The list described above with respect to block 515 may be equivalent to the list of block 410 of FIG. 4.

Figure 6:
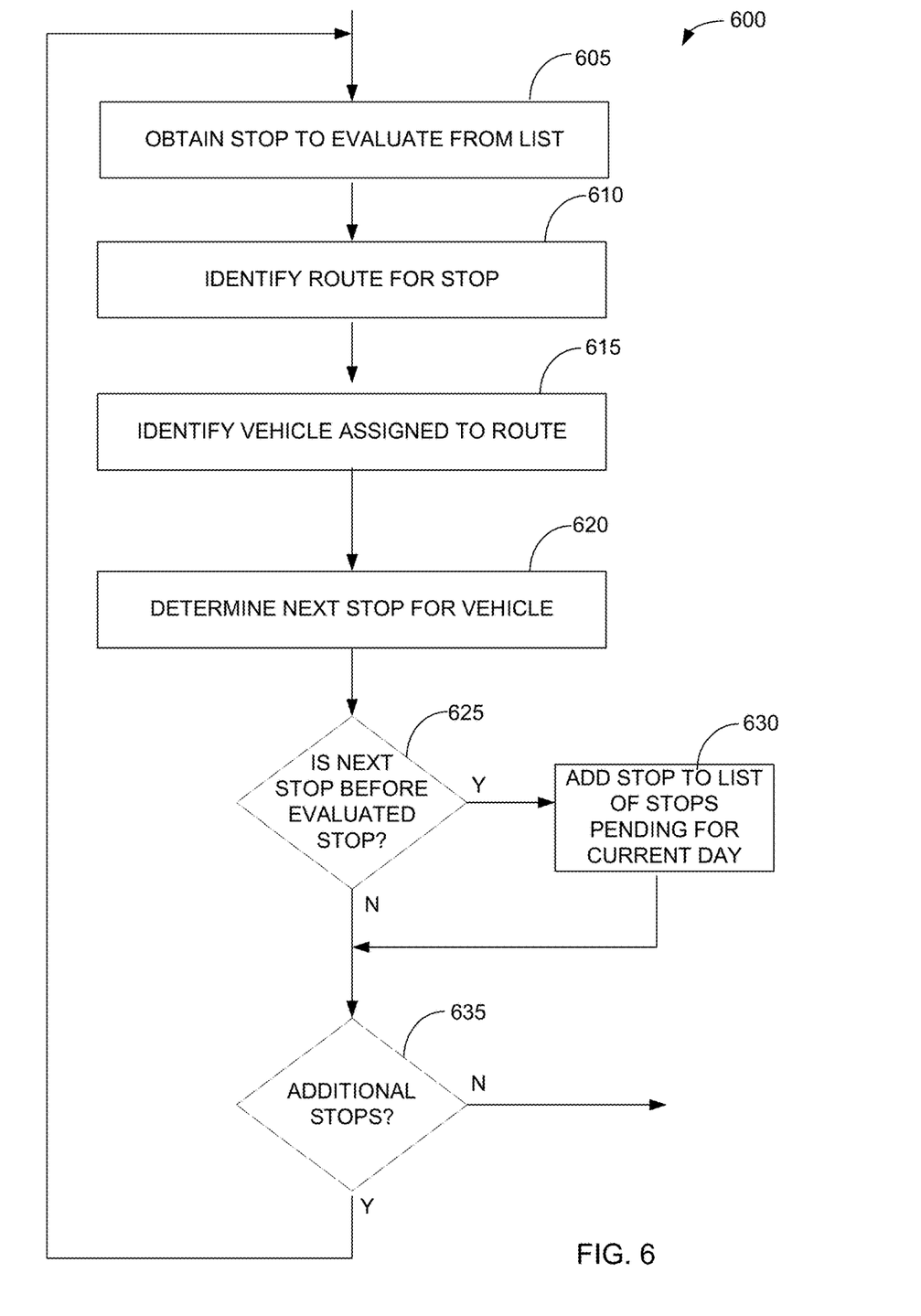
FIG. 6 is a flowchart for an exemplary method of identifying a subset of stops scheduled for a remaining portion of a day.

FIG. 6 is a flowchart for an exemplary method of identifying a subset of stops scheduled for a remaining portion of a day. In some aspects, process 600 is one way to implement block 420, discussed above with respect to FIG. 4. In some aspects, process 600 is implemented by an electronic hardware processor. For example, instructions stored in the on-demand servicing component 205 may configure an electronic hardware processor to perform one or more of the functions discussed below with respect to process 600.

In block 605, a stop is obtained from a list. In some aspects, the list is a list of stops, with each stop having an associated location, and an associated route of which the stop is a part. For example, the list may be the list referenced in blocks 410 and 420 of process 400. For example, block 410 may identify a list of route stops, and block 605 may obtain a stop from this list. In some aspects, the stop obtained in block 605 may be a stop identified by the route database 231, discussed above with respect to at least FIGS. 2 and 3. For example, in some aspects, block 605 may include reading the exemplary database 231 to obtain one row. In one exemplary aspect, the row may include a stop identification 332, route id 334, stop location 336, and next stop identification 338.

In block 610, a route for the stop is identified. In some aspects, the route is identified via route id 334 in the row retrieved from the exemplary database 231 or its equivalent in block 605.

In block 615, a vehicle assigned to the route is identified. In some aspects, identifying the vehicle may include searching the vehicle database 221 for the route identified in block 610. The row including the route ID column 306 that matches the route determined in block 610 may include the vehicle identifier for the vehicle in the vehicle ID column 302.

In block 620, a next stop for the vehicle is identified. In other words, the vehicle determined in block 615 may be currently performing its planned route. The vehicle may be performing stops, including picking up packages or delivering inventory items or packages as necessary. Thus, it may be necessary to determine whether the vehicle has yet to perform the stop of block 605. If the vehicle has already performed the stop, the vehicle may not be a good choice for performing an on-demand request, at least based on the inclusion of the stop of block 605 on its route (determined in block 610).

Block 625 determines whether the next stop determined in block 620 is a stop that occurs along the vehicle's route before the evaluated stop of block 605. In some aspects, this may be determined by traversing the route database 231, starting at the vehicle's next stop 308 of the vehicle database 221. For example, after identifying a row in the route database 231 for the next stop of the vehicle identified by the column 308 of the database 221, a second next stop may be identified from the route database 231 via the next stop ID 338. The row for the second next stop may then be found in the route database 231 to identify a third next stop. This process may continue until the stop of block 605 is found in the route, or an end of the route is reached (for example, a predetermined value for the next stop ID column 338 may signify the end of a route in some aspects). If the stop is found, then process 600 moves from block 625 to block 630, and the stop obtained in block 605 is added to a list of stops pending for the current day. In some aspects, the list referenced in block 630 may identify the subset of route stops scheduled for the remaining portion of the current day, described above with respect to block 420 of process 400.

Figure 7:
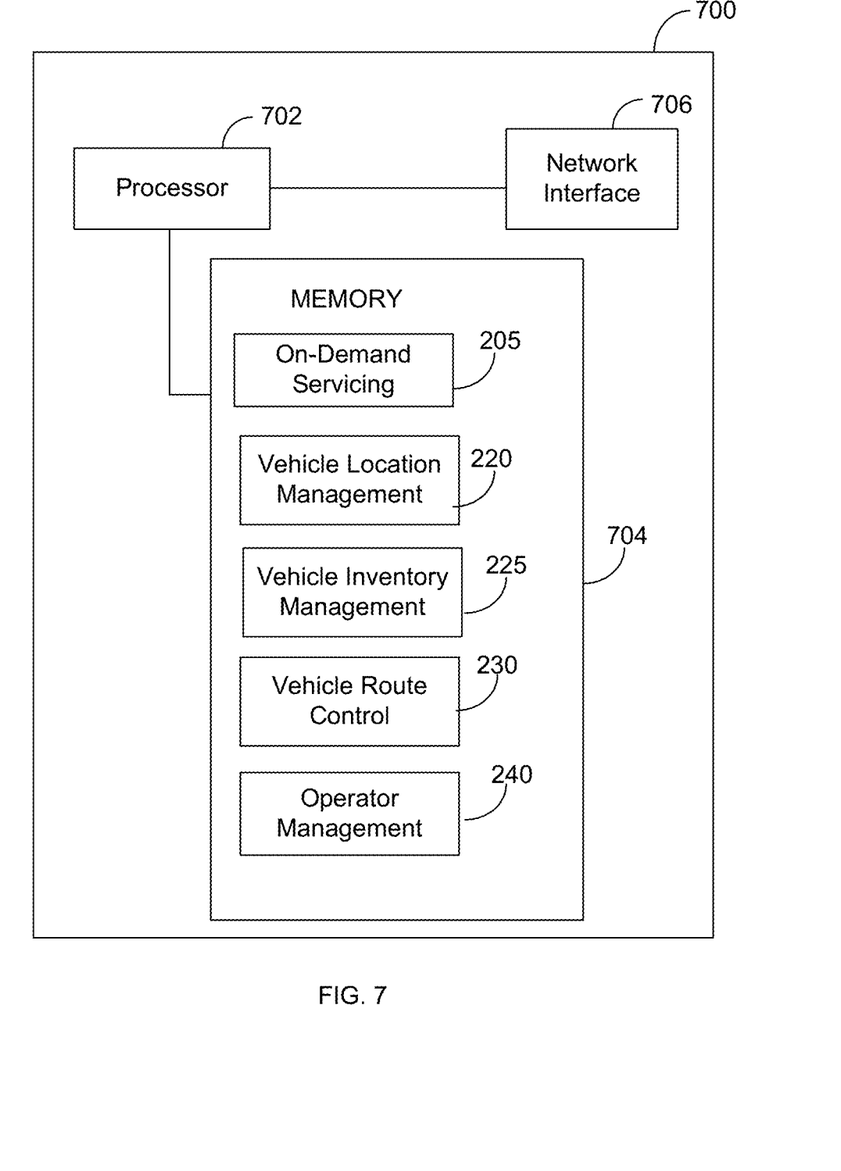
FIG. 7 is a block diagram of an exemplary device for performing one or more of the methods described herein.

FIG. 7 is a block diagram of an exemplary device for performing one or more of the methods described herein. While the block diagram of FIG. 7 illustrates a single device 700, in some aspects, one of skill in the art would recognize that the embodiments described herein may be performed by a combination of two or more devices. For example, an embodiment utilizing a cloud based infrastructure for execution of the described processes and methods is contemplated.

FIG. 7 includes an electronic hardware processor 702, electronic hardware memory 704, and a network interface 706. The memory 704 may store instructions that configure the processor 702 to perform one or more of the functions described herein. For example, the memory may store the on-demand servicing component 205, vehicle location management component 220, vehicle inventory management 225, vehicle route control component 230, and/or operator management component 240, discussed above with respect to FIG. 2. While FIG. 7 suggests one exemplary organization for instructions that may configure the processor 702, one of skill in the art would understand that the organization suggested by FIG. 7 is only exemplary. Other embodiments may organize the instructions that configure the processor 702 to perform one or more of the functions described herein in a myriad of different ways. For example, in some aspects, the components described above may be stored in a plurality of different hardware memories. In some aspects, the components described above may be distributed across two or more physical devices, each physical device including one or more hardware processors. In some aspects, the disclosed methods and systems may be implemented using a cloud infrastructure. In some such infrastructures, applications may be dynamically moved on demand within a pool of computing devices, each having one or more processors. At any one time, various portions of the components discussed above may be running in any number of cloud computing configurations.

Figure 8:
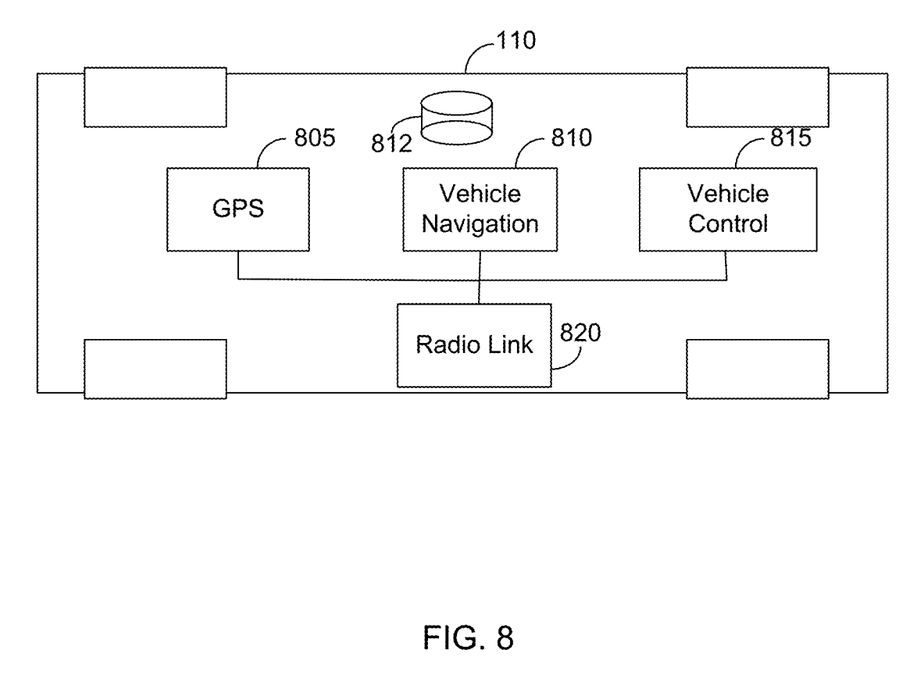
FIG. 8 is a block diagram of an exemplary delivery vehicle.

FIG. 8 is a block diagram of an exemplary delivery vehicle. The delivery vehicle 110 shown in FIG. 8 may be an exemplary embodiment of the delivery vehicles 110a-b shown in FIG. 1. The exemplary delivery vehicle 110 includes a global positioning system (GPS) receiver 805, vehicle navigation component 810, vehicle route database 812, a vehicle control component 815, and a radio link 820. The radio link 820 may enable one or more of the GPS receiver 805, vehicle navigation component 810, or vehicle control component 815 to communicate wirelessly with other components of the disclosed methods and systems, such as any of the components shown in FIG. 2.

The GPS receiver 805 may receive GPS signals from GPS satellites to determine a position of the vehicle 110. This information may be reported, via the radio link provided by radio link component 820 to, for example, the vehicle location management component 220. This may enable the disclosed methods and systems to maintain a current record of a location of the vehicle 110, and of multiple delivery vehicles, such as the vehicles 110a-b of FIG. 1, such that an appropriate vehicle can be selected to perform an on-demand transaction based, in part, on the vehicle's respective location.

The vehicle navigation component 810 may control navigation of the vehicle 110 along a route. Route information may be retrieved from the route database 812. In some aspects, the vehicle navigation component 810 may receive route updates via the radio link 820, from, for example, the vehicle route control component 230, illustrated with respect to FIG. 2. The vehicle navigation component 810 may provide instructions to the vehicle control component 815. For example, the vehicle navigation component 810 may send commands such as a command to turn the vehicle 110 to a particular heading, stop the vehicle 110, or drive the vehicle 110 at a particular speed to the vehicle control component 815.

The vehicle control component 815 may provide autonomous, electronic control of the vehicle 110 in some aspects. As discussed above, the vehicle control component 815 may receive commands such as a command to turn to a particular heading, stop, or drive at a particular speed from the vehicle navigation component 810. The vehicle control component 815 may maintain electronic interfaces with vehicle systems, such as braking systems, engine systems, and steering systems (not shown in FIG. 8) that can affect the commands received from the vehicle navigation component 810. In aspects of the vehicle 110 that may be manually controlled by a human operator, the vehicle control component 815 may function to display instructions to the human operator to effect particular routes. For example, upon receiving a command to move the vehicle to a particular address, the vehicle control component may display the address on a display screen of the vehicle, such that a human operator can read the display screen and drive the vehicle to the address. In some aspects, the human operator may be assisted by a navigation application that provides route information to the commanded address.

Figure 9:
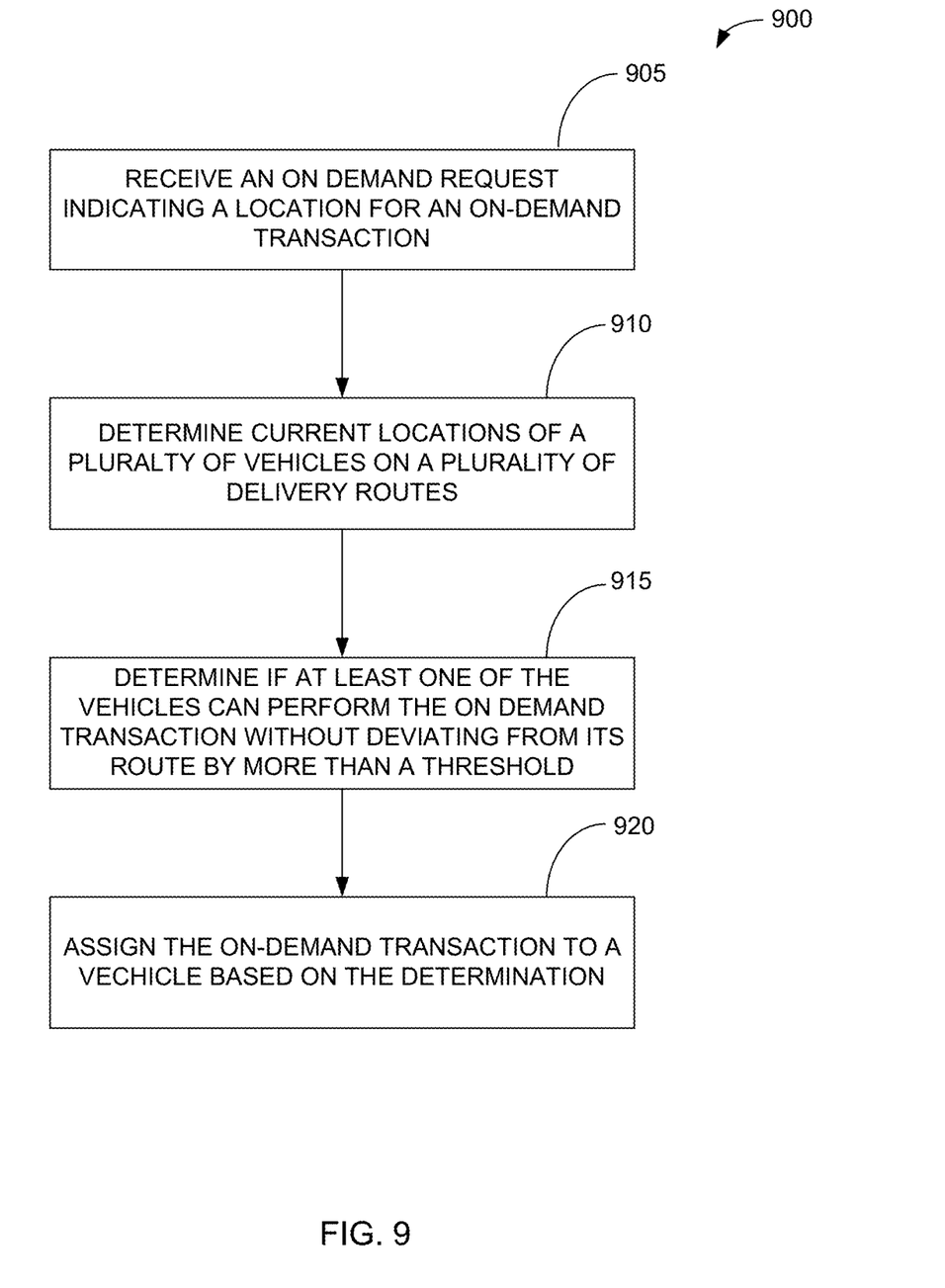
FIG. 9 is a flowchart for processing an on-demand request.

FIG. 9 is a flowchart for processing an on-demand request. In some aspects, the process 900 discussed below with respect to FIG. 9 may be performed by one or more of the components discussed above with respect to FIG. 2.

In block 905, an on-demand request is received. The request may include a location for an on-demand transaction. The on-demand transaction may take at least two forms. It may be a request to pick up a package at the location of the on-demand transaction. Alternatively, it may be a request to make a delivery at the location. The delivery may be for a package that is previously addressed to the location. For example, an individual at the location may have previously requested delivery of an item to the location, and the on-demand request is for the previously requested item to be delivered within a particular timeframe. Alternatively, the on-demand request may be a first request for the item. In some aspects, the request may be for an item that may be included in one or more vehicle inventories. For example, frequently ordered items may be stocked on-board delivery vehicles to facilitate quick delivery for these items. Thus, in some aspects, the on-demand request may identify one or more items for delivery. The items may be identified in some aspects, by specifying the item id 314 value for the item in the request.

In block 910, a current location of a plurality of vehicles on a plurality of delivery routes is determined. For example, in some aspects, the vehicle information table 221 may be searched to identify vehicle locations 304.

In block 915, a comparison of the on-demand delivery location to the determined vehicle locations is performed. The comparison may also consider the vehicle's route. For example, as discussed above with respect to FIG. 5, in some aspects, various stops included on a vehicle's route may be compared to the on-demand location, to determine an amount of deviation required for the vehicle to perform the on-demand transaction. The amount of deviation may be relevant to considerations such as ensuring compliance with employment agreements, which may have been negotiated as part of a union contract in some environments.

An operator for a vehicle may be identified. A maximum deviation for the operator may also be identified, for example, by searching the operator database 241. The vehicles eligible to satisfy the on-demand request may be filtered down to only those vehicles whose deviation to perform the on-demand request is below a maximum deviation allowed for the vehicle's operator.

In block 920, the on-demand transaction is assigned to a vehicle based on the determination. In some aspects, the on demand transaction may also be assigned to the vehicle based on inventory located on the vehicle itself. For example, if the on-demand request is for delivery of an item, block 920 may search the vehicle inventory database 226 to identify one or more vehicles that include the item on-board. The selection of a vehicle may then be limited to those vehicles. If one or more of those vehicles can deliver the item without exceeding the threshold discussed above with respect to block 915, then the on-demand request may be assigned to a vehicle selected from those one or more vehicles. In some aspects, block 920 may operate in accordance with process 400, discussed above with respect to FIG. 4.

Some aspects of process 900 include transmitting a command to the vehicle. The command may indicate that the vehicle will perform the on demand transaction. In some aspects, the transmission of the command may be performed by the vehicle route control component 230, discussed above with respect to FIG. 2. In some aspects, the vehicle is an autonomous vehicle. In these aspects, a vehicle navigation component 810 may be configured to receive the command, and adjust a route of the vehicle based on the command. For example, the vehicle navigation component 810 of FIG. 8 may send instructions to the vehicle control component 815 in response to receiving the command. The instructions may cause the vehicle control component 815 to steer the vehicle towards a location associated with the on-demand transaction. In some aspects, the command may update the route database 812 of the vehicle 110. The vehicle navigation component 810 may then read control data from the database 812 to determine where to steer the vehicle 110.

In some embodiments, the on-demand transaction can be assigned in block 920 by sending instructions to a mobile device carried by a delivery resource, such as a carrier. The mobile device can be a mobile computing device. In some embodiments, the mobile device can be integrated into the vehicle 110. Instructions can be sent to the mobile device requiring the carrier associated with the vehicle to confirm the instructions. The on-demand servicing component 205 can send turn-by-turn instructions to the mobile device.

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. An on-demand logistics system, comprising:
   a network interface circuit configured to receive a first electronic communication from a customer, the first electronic communication including an on-demand request for pick up and/or delivery of an item; and
   an electronic hardware processor, configured to:
      identify, in the on-demand request, a location for the requested item pick up and/or delivery;
      identify, within a geographic area, a plurality of routes, each of the plurality of routes comprising a plurality of stops and having a corresponding vehicle traveling the route when the on-demand request is received;
      determine, from the plurality of routes, a subset of stops which are within a threshold distance of the location for the requested item pick up and/or delivery and which are still pending for the current day;
      determine a stop from the subset of stops which has the minimum distance from the location for the requested item pick up and/or delivery;
      determine a route from the plurality of routes that includes the determined stop;
      assign the requested item pick up and/or delivery to the vehicle corresponding to the determined route based on a determination that (1) addition of the location as an additional stop to the determined route does not violate time constraints associated with the determined route and the on-demand request and (2) addition of the location as the additional stop to the determined route does not exceed a defined maximum deviation distance for the vehicle traveling the determined route; and
      generate a second electronic communication to the assigned vehicle, the second electronic communication comprising a command that designates the assigned vehicle to travel to the location,
      wherein the network interface circuit is further configured to transmit the second electronic communication to the assigned vehicle.

2. The system of claim 1, wherein the request identifies the item for delivery to the location, and wherein the electronic hardware processor is configured to identify the plurality of routes based on the item for delivery to the location.

3. The system of claim 2, wherein identifying the plurality of routes comprises identifying, and including in the plurality of routes, those routes that have the corresponding vehicles which include the item in a vehicle inventory and that have at least one stop within a threshold distance of the location.

4. The system of claim 1, wherein the electronic hardware processor is further configured to receive location updates for the corresponding vehicle for each of the plurality of routes and to determine locations of the corresponding vehicle for each of the plurality of routes at least partially based on the location updates, and to determine whether a stop is still pending for the current day based on the determined location of the vehicle and a list of stops for each of the plurality of routes stored in a route database.

5. The system of claim 1, wherein the command instructs the assigned vehicle to perform the requested item pick up and/or delivery.

6. The system of claim 5, wherein the vehicle is an autonomous vehicle, and the command updates a route in an on-board vehicle control computer of the vehicle.

7. The system of claim 1, wherein the electronic hardware processor is further configured to select the determined route based on a determination that the determined route is a route that requires a minimum amount of distance deviation to fulfill the on-demand request, and wherein the requested item pick up and/or delivery is assigned to the vehicle corresponding to the determined route.

8. The system of claim 7, wherein the electronic hardware processor is configured to determine the route requiring the minimum amount of deviation by:
   determining, for each of the plurality of routes, the minimum route deviation distance required to fulfill the on-demand request;
   determining operators for the plurality of routes;
   determining the maximum deviation distance allowed for operators of the vehicles; and
   determining which of the plurality of routes has the smallest minimum deviation distance which also does not exceed its operator's maximum deviation distance.

9. The system of claim 7, wherein the electronic hardware processor is further configured to determine whether the requested item pick up and/or delivery will be fulfilled within geographic and vehicle constraints.

10. A method comprising:
    receiving a first electronic communication from a customer, the first electronic communication including an on-demand request for pick up and/or delivery of an item;
    identifying, in the on-demand request, a location for the requested item pick up and/or delivery;
    identifying, within a geographic area, a plurality of delivery routes, each of the plurality of delivery routes comprising a plurality of stops and having a corresponding vehicle traveling the delivery route when the on-demand request is received;
    determining, from the plurality of delivery routes, a subset of stops which are within a threshold distance of the location for the requested item pick up and/or delivery and which have at least one remaining stop along their respective routes;
    determining a stop from the subset of stops which has the minimum distance from the location for the requested item pick up and/or delivery;
    determining a route from the plurality of routes that includes the determined stop;
    assigning the requested item pick up and/or delivery to a vehicle corresponding to the determined route based on a determination that (1) addition of the location as an additional stop to the determined route does not violate time constraints associated with the determined route and the on-demand request and (2) addition of the location as the additional stop to the determined route does not exceed a defined maximum deviation distance for the vehicle traveling the determined route;

generating a second electronic communication to the assigned vehicle, the second electronic communication comprising a command that designates the assigned vehicle to travel to the location and transmitting the second electronic communication to the assigned vehicle.

11. The method of claim 10, wherein the request identifies the item for delivery to the location, and further comprising determining the determined route further based on vehicle inventory of the item on each of the plurality of routes.

12. A non-transitory computer readable medium comprising instructions that when executed cause an electronic hardware processor to perform a method of assigning an on-demand request to a vehicle on a delivery route, the method comprising:

receiving a first electronic communication from a customer, the first electronic communication including an on-demand request for pick up and/or delivery of an item, the request indicating a location for the requested item pick up and/or delivery;

determining, in a geographic area, a plurality of routes, each of the plurality of routes comprising a plurality of stops and having a corresponding vehicle traveling the route when the on-demand request is received;

determining, from the plurality of routes, a subset of stops which are within a threshold distance of the location for the requested item pick up and/or delivery and which are still pending for the current day;

determining a stop from the subset of stops which has the minimum distance from the location for the requested item pick up and/or delivery;

determining a route from the plurality of routes that includes the determined stop;

assigning the requested item pick up and/or delivery to the vehicle corresponding to the determined route based on a determination that (1) addition of the location as an additional stop to the determined route does not violate time constraints associated with the determined route and the on-demand request and (2) addition of the location as the additional stop to the determined route does not exceed a defined maximum deviation distance for the vehicle traveling the determined route;

generating a second electronic communication to the assigned vehicle, the second electronic communication comprising a command that designates the assigned vehicle to travel to the location; and transmitting the second electronic communication to the assigned vehicle.

13. The non-transitory computer readable medium of claim 12, wherein the request identifies the item for delivery to the location, and wherein the electronic hardware processor is configured to determine the geographic area based on the item for delivery to the location.

14. The non-transitory computer readable medium of claim 13, wherein determining the plurality of routes comprises identifying, and including in the plurality of routes, those routes that have the corresponding vehicles which include the item in a vehicle inventory and that have at least one stop within a threshold distance of the location.

15. The non-transitory computer readable medium of claim 12, wherein the method further comprises receiving location updates for the corresponding vehicle for each of the plurality of routes, determining locations of the corresponding vehicle for each of the plurality of routes at least partially based on the location updates, and determining whether a stop is still pending for the current day based on the determined location of the vehicle and a list of stops for each of the plurality of routes stored in a route database.

16. The non-transitory computer readable medium of claim 12, wherein the command instructs the assigned vehicle to perform the requested item pick up and/or delivery.

17. The non-transitory computer readable medium of claim 16, wherein the vehicle is an autonomous vehicle, and the command updates a route database of an on-board vehicle control computer of the vehicle.

18. The non-transitory computer readable medium of claim 12, wherein the method further comprises determining, from among the determined plurality of routes, a route requiring a minimum amount of deviation to fulfill the on-demand request, and wherein the requested item pick up and/or delivery is assigned to the vehicle corresponding to the one of the determined routes requiring the minimum amount of deviation.

19. The non-transitory computer readable medium of claim 18, wherein determining the route requiring the minimum deviation distance comprises:

determining, for each of the plurality of routes, the minimum route deviation distance required to fulfill the on-demand request;

determining the maximum deviation distance for operators of the vehicles; and determining which of the determined plurality of routes has the smallest minimum deviation distance which also does not exceed its operator's maximum deviation distance.

* * * * *